United States Patent

[11] 3,537,383

[72] Inventor  Gianfranco Croce
                Pontecurone, Italy
[21] Appl. No. 793,752
[22] Filed      Jan. 24, 1969
[45] Patented   Nov. 3, 1970
[73] Assignee   Officine Cimbali Giuseppe S.P.A.
                Binasco (Province of Milan), Italy
                a corporation of Italy
[32] Priority   Jan. 30, 1968
[33]            Italy
[31]            12,201A/68

[54] COFFEE MACHINE
     7 Claims, 5 Drawing Figs.
[52] U.S. Cl. .................................................. 99/289
[51] Int. Cl. ............................................ A47j 31/34
[50] Field of Search ...................................... 99/289,
                                295, 297, 298, 299, 300, 302

[56]            References Cited
           UNITED STATES PATENTS
2,387,871  10/1945  Baumann ......................

2,935,011  5/1960   Perlman .......................
3,084,047  4/1963   Holstein ........................
3,292,526  12/1966  Heier .............................

Primary Examiner—Robert W. Jenkins
Attorney—Guido Modiano and Albert Josif

ABSTRACT: This disclosure relates to a machine for infusing coffee and like liquid extracts which comprises a plate having a bore and arranged to reciprocate between a first and a second position, means being provided in said first position for supplying a load of coffee grounds into said bore, pressing means for pressing said coffee grounds and expelling the load of coffee grounds precedingly supplied into said bore, hot water supply means being arranged to pass hot water into said bore from above when said plate is in said second position and receptacle means arranged below said bore in said second position so as to receive the coffee infusion resulting from the passage of said hot water through the coffee grounds contained in said bore.

INVENTOR.
Gianfranco CROCE

INVENTOR.
Gianfranco CROCE

COFFEE MACHINE

BACKGROUND OF THE INVENTION

The present invention relates to a unit for the preparation of coffee infusion, particularly espresso coffee, in a manner which can be completely automatic.

There are already known completely automatic bar coffee machines and coffee slot machines, which are, however, generally subject to various inconveniences and problems.

First of all it is necessary to wash the coffee filters after each delivery of coffee, for which operation there is employed a highly compressed jet of water passed onto to the filter after the discharge of the exhausted coffee powder.

The washing water must then be collected in suitable containers or also waste outlets have to be arranged in the sewer network, such waste outlets necessarily having a large diameter so as to reduce as much as possible the danger of clogging due to successive deposit of scale.

Naturally said system renders necessary a considerable quantity of water; this problem being particularly serious and noted in the case of self-sufficient machines provided with their own water reserve on which the water for washing the coffee filters makes heavy demands. As an evident consequence the autonomy of the machines is reduced or the size thereof is increased since it is necessary to provide reserve reservoirs of large volume.

Another problem which has never satisfactorily been solved until now is that of the pressing of the coffee powder in the coffee filter before preparing the coffee infusion.

In fact this pressing, even if carried out by hand as in the case of nonautomatic bar coffee machines, is necessary in order to prevent the hot water, fed to the coffee filter during the preparation of the coffee and having a certain turbulence, from vorticosely moving the coffee contained in the filter, creating preferred paths and, in the best of cases, not fully exploiting the entire dose of coffee powder.

Furthermore, in the case of automatic coffee distributor machines there is usually provided a series of separate stations in which the operations of dosing of the coffee powder, pressing, preparation and delivery of the coffee, discharge of the exhausted load and washing of the coffee filter occur separately and in ordered sequence. In general these are cumbersome machines provided with rotating drums or trunnion-type filters in rotational movement, in which, besides complicated mechanisms and transmissions, a complex electrohydraulic circuit is necessary for the simultaneous performance of the different operations of the different stations. Moreover the dispersions of heat, and thus of energy, supplied for heating the water of the boiler, are considerable and completely passive.

SUMMARY OF THE INVENTION

The present invention obviates said inconveniences and problems by means of a machine for the preparation of coffee infusions, particularly espresso coffee, and like liquids, in which a plate having a through hole is arranged to reciprocate between a first position in which said hole is arranged beneath a coffee grounds distributor means in order to receive a load of coffee grounds and a second position in which said hole is arranged beneath a hot water distributor means for passing hot water onto said load coffee grounds, receptable means being arranged beneath said hole in said second position for receiving the coffee infusion formed by the passage of said hot water through said load of coffee grounds, pushing means being provided adjacent said hole in said first position for pressing said load of coffee grounds and simultaneously ejecting from said hole the spent load of coffee grounds precedingly loaded into said hole and subsequently infused.

In order better to put in evidence the advantages and the fundamental characteristics of the present invention it is firstly necessary to point out that coffee powder has a strong tendency to absorb water so that after the delivery of the coffee the exhausted coffee powder tends to form a compact and rather resistant cylinder and to increase in volume. With the unit of the present invention the precompressed plug of coffee powder is carried back to said first position, after the delivery of the coffee, and forms a platform on which the dose of powder deposits, and gradually gives way to the latter its own position in the holed plate under the action of a piston for pressing the new load of coffee. In this manner the plug of exhausted coffee is replaced by a plug of fresh coffee powder which, during said replacement, is compacted and precompressed sufficiently for the successive sprinkling, in said second position, by said filter means without the above-mentioned inconveniences of turbulence and incomplete exploitation of the coffee load.

The main advantage of the present invention resides in the extreme compactness and rationality of the parts, excluding any complicated mechanism and thus drastically reducing the possibility of breakdown of misfunctioning of the machine.

BRIEF DESCRIPTION OF THE DRAWINGS

Other objects and advantages of the present invention will appear in part from the description which follows and in part will be pointed out in the course thereof, with reference to a preferred embodiment given by way of nonlimiting example, illustrated in the accompanying drawings.

In the drawings.

DESCRIPTION OF THE PREFERRED EMBODIMENT

Figure 1:
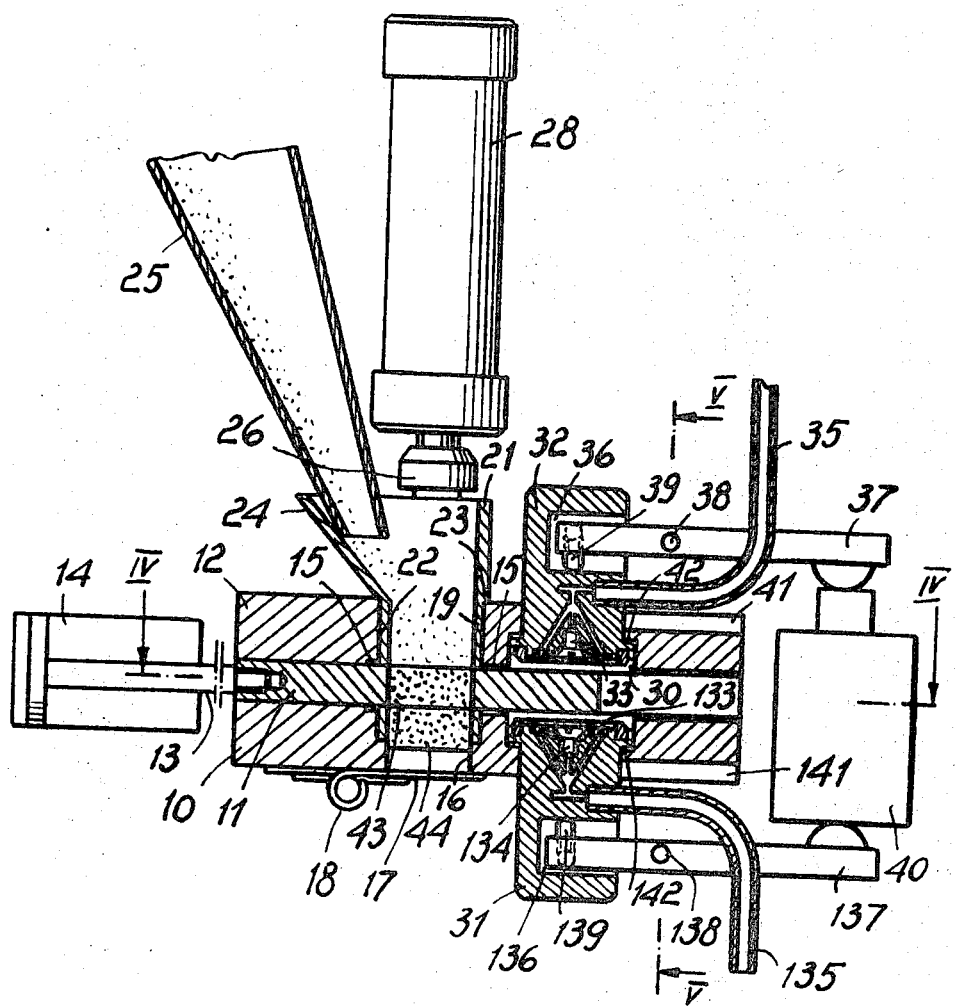
FIG. 1 is a diagrammatic sectional view of the automatic unit according to the present invention.

With reference to the FIGS. the automatic unit for the preparation of coffee comprises a base plate 10 of U-shaped cross section in whose hollow is housed a slab 11, said hollow being closed from above by a second plate 12 so that the slab 11 can freely slide in the passage formed by the two plates 10 and 12.

At one end of the slab 11 there is connected a rod 13 which is connected to a device 14, which in the illustrated case is a piston device, designed to reciprocate the rod 13, and thus the slab 11, between two positions, as will be explained better hereinafter. In order to facilitate the sliding of the slab 11 there are provided sliding blocks of antifriction material, for instance that known under the registered trademark "Teflon" indicated by the reference number 15 and also having the purpose of preventing the infiltration of coffee powder and extraneous substances in the sliding guide of the slab 11.

In the plate 10 there is provided a hole 16, preferably of circular cross section, designed to be closed from below by a resilient lamina 17 which is pivoted in 18. In the plate 12, there is provided a hole 19 which has the same cross section and size as the hole 16 and is axially aligned therewith. Finally the slab 11 is provided, in a suitably calculated position, with a hole 20, which in a first position of said slab, is perfectly axially aligned with the holes 16 and 19 of said plates 10 and 12.

In the holes 16 and 19 there is housed a vertical sleeve 21 which has a slit 22 of dimensions such as to permit the free sliding of the slab 11.

Above the upper surface of the plate 12 said sleeve 21 has a support step 23 and a nonsymmetrical flaring 24, designed to act as a chute for the coffee powder fed in successive doses by a funnel distributor 25. This latter will be provided with valve means, for example electromagnetic valve means, for the successive feeding of doses of coffee powder. In the internal cavity of the sleeve 21 can slide vertically and reciprocally a piston 26 whose rod 27 is controlled by a driving unit 28 of any known type and designed to displace the piston between the positions shown in FIGS. 1 and 2 respectively. It is important to note that the maximum stroke of the piston 26 is such as to carry the lower surface of the piston 26 into perfect alignment with the internal surface of the plate 12.

Said hollow between the plates 10 and 12 forms a chamber 30 in which are housed on opposite sides respectively of the slab 11, two filter-holder pistons 31 and 32 respectively which are identical so that it will be sufficient to describe only one of them.

The piston 32 has its surface exposed in the chamber 30 formed by a filter or sprinkler 33 connected to a system of canals and collectors generally indicated at 34 and connected to an external communication tube 35. The corresponding parts of the piston 31 are indicated by the same reference numerals increased by 100. The piston 32 has a cavity 36 in which is housed a lever 37, pivoted in 38, whose end inside the cavity 36 is fast with a pin 39 designed to transmit the force of the lever onto the relative piston. The outer ends of the two symmetric levers 37 and 137 may be displaced between two positions, respectively shown in FIG. 1 and FIG. 3, by means of the device generally indicated with reference numeral 40 and which may be of any convenient type well known in the art. It will be noted that the two plates 10 and 12 have hollows 41 and 141 designed to receive the correspondent portion of the tubes 35 and 135 when the two pistons 31 and 32 are in the closure position, shown in FIG. 3. The two tubes 35 and 135 can be connected one to a hot water distributor and the other to a device for discharging the prepared coffee into a suitable container, for example a cup.

Figure 3:
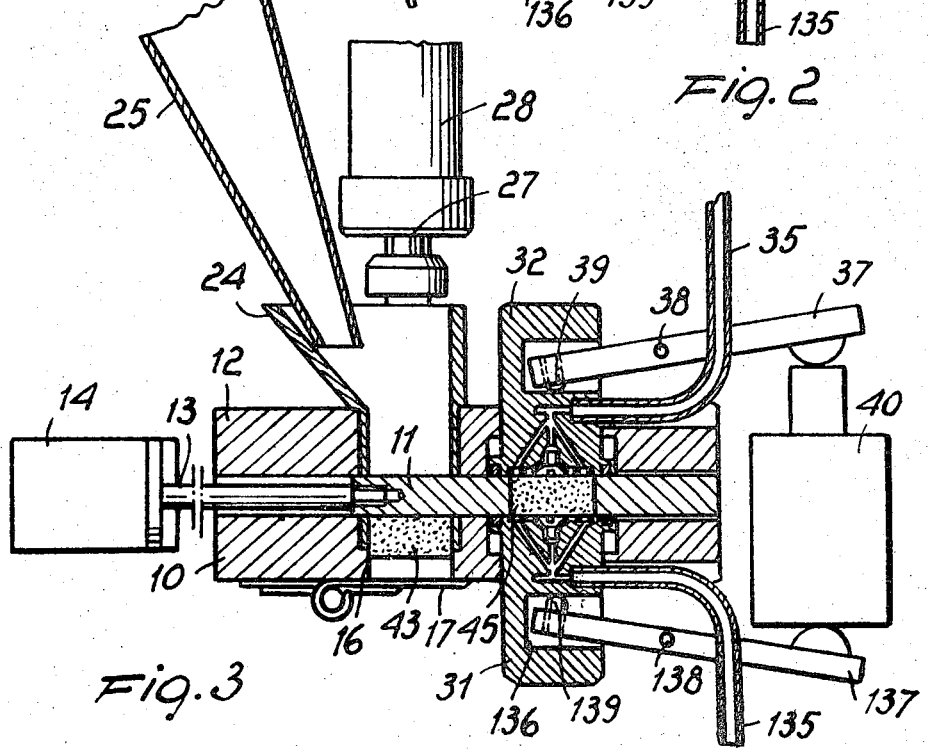
Figure 4:
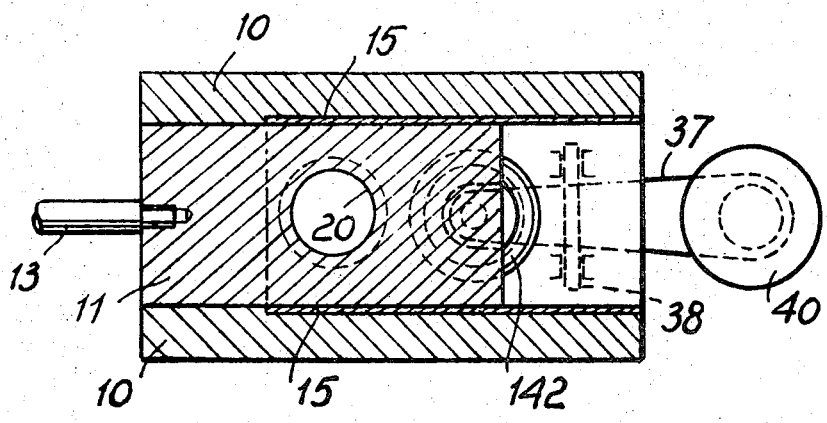
FIG. 4 is a plan sectional view along the line IV-IV of FIG. 1.
Figure 5:
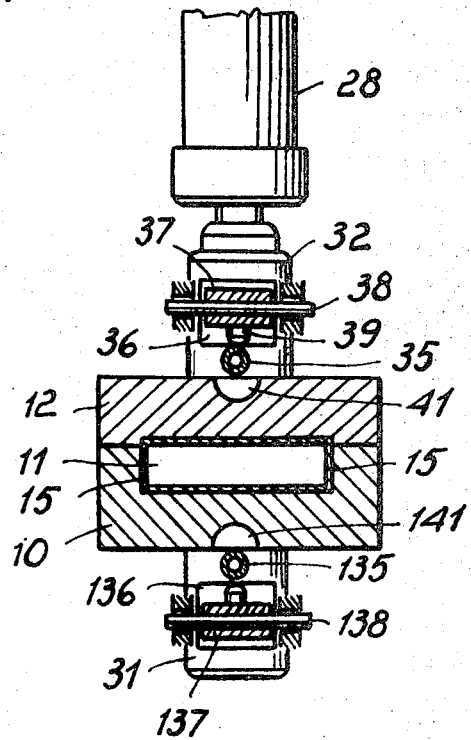
FIG. 5 is a sectional view along the line V-V of FIG. 1.

From FIG. 3 it will be seen that, when the slab 11 occupies the second position, the hole 20 is in axial alignment with the pistons 31 and 32, which are sealed with the edges of the slab by means of gaskets 42 and 142.

Figure 2:
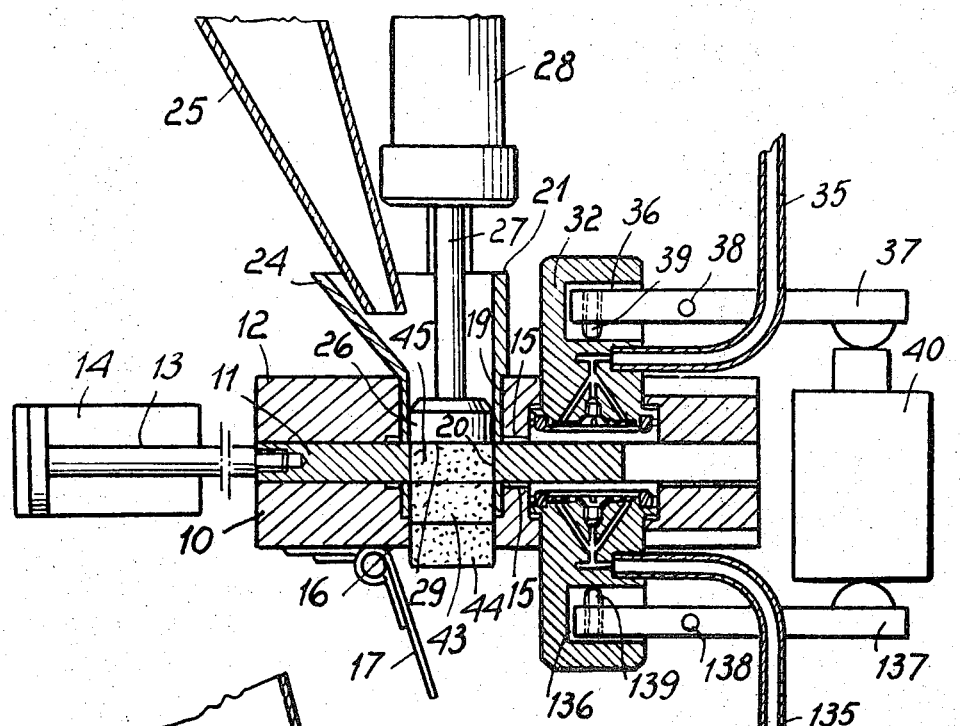
FIG. 2 and FIG. 3 are views similar to FIG. 1, which show different conditions of the various members.

With reference to FIGS. 1, 2 and 3, which show the different positions of the members of the machine according to the present invention in the sequence of operation for the preparation of a dose of coffee in fusion the machine initially occupies the position shown in FIG. 1, with the spent coffee dose 43 still contained in the hole 20. At this point, following a suitable control a dose of fresh coffee grounds falls from the funnel 25 and, with the aid of the flaring 24 of the sleeve 21, deposits on the spent dose 43. It should be noted that, in order to prevent the collection of coffee on the funnel 25, it is possible to arrange that the feeder (not shown) imparts a certain number of vibrations to the funnel at the end of the delivery of the dose of coffee grounds.

Successively, the driving unit 28 actuates the piston 26 which, in its downward stroke, stops in the position shown in FIG. 2 and, in this manner, compresses the load of fresh coffee into the hole 20, substituting it for the spent load 43 which is displaced into the underlying hole 16. The spent load 44, exploited in the delivery immediately preceding that of the load 43 will be discharged to the outside by opening the spring 17, which opposes a neglible resistance to the opening. The spring 17 could also be a manually actuatable flap and serves solely for the starting of the machine after which it can remain completely open.

At this point a pressed plug 45 of fresh coffee grounds is formed in the hole 20.

The device 14 at this point transfers through a suitable control, the slab 11 into the position shown in FIG. 3 inside the chamber 30 which is axially aligned with the pistons 31 and 32. The device 40 is then actuated and consequently the pistons 31 and 32 stop against the upper and lower surfaces of the compressed plug 45, forming a seal, as previously mentioned, through the gaskets 42 and 142 on the opposite surfaces of the slab 11. Finally the dose of hot water is fed, for example through the tube 35, while the tube 135 collects the coffee.

It is clear that in order to impart the controls for the above-illustrated operations in synchronized manner and in ordered sequence, it is possible to employ a programmer timer, for example of the cam type normally employed in washing machines and the like.

It should also be noted that the various devices such as the coffee grounds distributor, the hot water supplier, and the coffee collector, have not been shown in the FIGS. since they may be of any type well known in the art.

It remains to finally observe that, only in the starting phase of the machine one or two loads of coffee will be lost in order to constitute the base on which are formed, in the hole 16, the precompressed plugs of fresh coffee powder, after which the machine will work as described until the final demounting. This disadvantage becomes absolutely neglible when it is considered that on the basis of the test carried out, the machine of the present invention has a working duration, without interrruption and without need of demounting or maintenance, almost tenfold in comparison with existing types.

Finally it is possible to arrange different units of the above-described type coupled together in order to satisfy any needs of quantity and preparation speed of the coffee.

It will be appreciated that it is possible to make modifications and variations to the above-described machine, while remaining within the scope of the invention as illustrated in the description and defined in the claims which follow.

I claim:

1. A machine for the preparation of coffee infusions, particularly espresso coffee, and like liquids, in which a plate having a through hole is arranged to reciprocate between a first position in which said hole is arranged beneath a coffee grounds distributor means in order to receive a load of coffee grounds and a second position in which said hole is arranged beneath a hot water distributor means for passing hot water onto said load of coffee grounds, receptacle means being arranged beneath said hole in said second position for receiving the coffee infusion formed by the passage of said hot water through said load of coffee grounds, pushing means being provided adjacent said hole in said first position for pressing said load of coffee grounds and simultaneously ejecting from said hole the spent load of coffee grounds precedingly loaded into said hole and subsequently infused.

2. A machine as claimed in claim 1 in which said coffee grounds distributor means comprises a coffee grounds distributor communicating with a vertical channel having a substantially constant cross section which is substantially equal to the cross section of said hole, said hole being arranged to be coaxial with said vertical channel in said first position of said plate and not to communicate with said vertical channel in said second position said plate being arranged to reciprocate transversely with respect to said vertical channel.

3. A machine as claimed in claim 1, wherein said spent load of coffee grounds is ejected into a chamber which is coaxial with and beneath said hole in said first position, said chamber having a cross section substantially equal to the cross section of said hole, and said spent load of coffee grounds being arranged to support said load of coffee grounds in said hole in said first position.

4. A machine as claimed in claim 1, wherein said pushing means comprises a piston which is arranged to reciprocate in said vertical channel.

5. A machine as claimed in claim 1, wherein in said second position said hot water distribution means are in seal pressure against the upper surface of said load of coffee grounds contained in said hole and said receptacle means are in seal pressure against the lower surface of said load of coffee grounds, said hot water distribution means and said receptacle means being arranged to retain such positions for the entire duration of infusion.

6. A machine as claimed in claim 1, wherein said hot water distribution means and said receptacle means are mobile between a first position of engagement and a second position of disengagement with the upper and lower surfaces of said load of coffee grounds.

7. A machine as claimed in claim 1, wherein the movements and the relative controls of said plate, said coffee grounds distributor means, said pusher means, said hot water distributor means and said receptacle means are arranged in preordered sequence by a programmer-timer device.